United States Patent
Palacio et al.

(10) Patent No.: US 9,557,227 B2
(45) Date of Patent: Jan. 31, 2017

(54) LUMINESCENT ORGANIC/INORGANIC MATRIX, METHOD FOR THE PRODUCTION THEREOF AND LUMINESCENT MOLECULAR THERMOMETER BASED ON SAID MATRIX

(75) Inventors: Fernando Palacio, Zaragoza (ES); Ángel Millán Escolano, Zaragoza (ES); Nuno Joan Oliveira Silva, Zaragoza (ES); Luis Antonio Dias Carlos, Aveiro (PT); Vitor Amaral, Aveiro (PT); Patricia Lima, Aveiro (PT); Carlos Brites, Aveiro (PT)

(73) Assignees: Universidad de Averio, Averio (PT); Consejo Superior de Investigaciones Científicas (CSIC), Madrid (ES)

( * ) Notice: Subject to any disclaimer, the term of this patent is extended or adjusted under 35 U.S.C. 154(b) by 1275 days.

(21) Appl. No.: 13/380,671

(22) PCT Filed: Jun. 25, 2010

(86) PCT No.: PCT/ES2010/070430
§ 371 (c)(1),
(2), (4) Date: Apr. 2, 2012

(87) PCT Pub. No.: WO2010/149818
PCT Pub. Date: Dec. 29, 2010

(65) Prior Publication Data
US 2012/0183012 A1    Jul. 19, 2012

(30) Foreign Application Priority Data
Jun. 26, 2009    (ES) .................................. 200930367

(51) Int. Cl.
*G01K 1/00* (2006.01)
*G01K 11/20* (2006.01)
*C09K 11/06* (2006.01)

(52) U.S. Cl.
CPC ............... *G01K 11/20* (2013.01); *C09K 11/06* (2013.01); *C09K 2211/182* (2013.01)

(58) Field of Classification Search
USPC .................................................. 374/120, 121
See application file for complete search history.

(56) References Cited

U.S. PATENT DOCUMENTS

| | | | | |
|---|---|---|---|---|
| 4,215,275 A | * | 7/1980 | Wickersheim | G01J 5/48 356/44 |
| 4,302,970 A | * | 12/1981 | Snitzer | G01K 11/32 374/131 |
| 4,708,494 A | | 11/1987 | Kleinerman | |
| 4,791,585 A | | 12/1988 | Maki | |

(Continued)

OTHER PUBLICATIONS

Aizawa et al., "Fluorescence thermometer based on the photoluminescence intensity ratio in Tb doped phosphor materials," Sensors and Actuators A 126 (2006) 78-82.

(Continued)

*Primary Examiner* — Mirellys Jagan
(74) *Attorney, Agent, or Firm* — Hayes Soloway PC (57) ABSTRACT

Thermometer comprising an organic-inorganic matrix which comprises tris complex (β-diketonate) of two different cations of lanthanide elements. In addition, the invention also relates to the matrix, methods for preparing it and methods of using a thermometer to measure absolute temperatures.

21 Claims, 6 Drawing Sheets

(56) References Cited

U.S. PATENT DOCUMENTS

| | | | | |
|---|---|---|---|---|
| 5,730,528 | A | * | 3/1998 | Allison .............. G01K 11/20 250/459.1 |
| 7,651,771 | B2 | * | 1/2010 | Meyer ............... C09K 11/7741 428/403 |
| 2003/0128737 | A1 | | 7/2003 | McGrath |
| 2006/0083694 | A1 | * | 4/2006 | Kodas et al. ............... 424/46 |
| 2007/0059705 | A1 | * | 3/2007 | Lu et al. ..................... 435/6 |
| 2007/0063154 | A1 | * | 3/2007 | Chen et al. ............. 250/483.1 |
| 2007/0096057 | A1 | * | 5/2007 | Hampden-Smith et al. ................... 252/301.16 |
| 2007/0274664 | A1 | * | 11/2007 | van Veggel et al. ......... 385/142 |
| 2008/0072705 | A1 | * | 3/2008 | Chaumonnot et al. ........ 75/338 |

OTHER PUBLICATIONS

Baker et al., "Noncontact two-color luminescence thermometry based on intramolecular luminophore cyclization within an ionic liquid," Chem. Commun. (2003) 2932-2933.

Lee and Kotov, "Thermometer design at the nanoscale," Nanotoday (Feb. 2007) vol. 2, No. 1, 48-51.

Singh et al., "Er3+/Yb3+ codoped Gd2O3 nano-phosphor for optical thermometry," Sensors and Actuators A 149 (2009) 16-20.

Uchiyama et al., "Luminescent Molecular Thermometers," Journal of Chemical Education (May 2006) vol. 83, No. 5, 720-727.

Binnemans, "Rare-Earth Beta-Diketonates," in Handbook on the Physics and Chemistry of Rare Earths vol. 35, Eds.: K.A. Gschneidner, Jr., J.-C.G. Bünzli and V.K. Pecharsky, Elsevier Science, Amsterdam (2005) 107-272.

Khalil et al., "Europium beta-diketonate temperature sensors: Effects of ligands, matrix, and concentration," Rev. Sci. Instrum., (Jan. 2004) vol. 75, No. 1, 192-206.

International Preliminary Report on Patentability, issued in International application No. PCT/ES2010/070430, issued Jan. 4, 2012.

Lima et al., "Spectroscopic Study of a UV-Photostable Organic-Inorganic Hybrids Incorporating an Eu3+ beta-Diketonate Complex," ChemPhysChem, A Journal of Chemical Physics and Physical Chemistry. 2006, vol. 7, No. 3, pp. 735-746.

Written Opinion of the International Searching Authority, issued in International application No. PCT/ES2010/070430 mailed Oct. 22, 2010.

International Search Report, issued in International application No. PCT/ES2010/070430, mailed Oct. 22, 2010.

Sato S et al, "Temperature sensors by multicolor-fluorescent films of rare earth chelate compounds", Database Inspec [Online] The Institution of Electrical Engineers, Stevenage AG, Oct. 1989, *abstract.

Patricia P Lima et al, "Spectroscopic Study of a UV-Photostable Organic Inorganic Hybrids Incorporating an Eu+-beta-Diketonate Complex", Chemphyschem—A European Journal of Chemical Physics & Physicalchemistry, Wlley, vol. 7, No. 3, Mar. 13, 2006 pp. 735-746.

Gamal E. Khalil ezt al, "Europium beta-diketonate temperature sensors: Effects of Ligands, matrix, and concentration", Review of Scientific Instruments, vol. 75, No. 1, Jan. 31, 2004, pp. 192.

Sergey M. Borisov et al, "Temperature-Sensitive Europium(III) Probes and Their Use for Simultaneous Luminescent Sensing of Temperature and Oxygen", Analytical Chemistry, vol. 78 No. 14, Jul. 15, 2006, pp. 5094-5101.

* cited by examiner

LUMINESCENT ORGANIC/INORGANIC MATRIX, METHOD FOR THE PRODUCTION THEREOF AND LUMINESCENT MOLECULAR THERMOMETER BASED ON SAID MATRIX

CROSS-REFERENCE TO RELATED APPLICATION

This application is a national stage application under 35 U.S.C. §371 of International Application No. PCT/ES2010/070430, filed Jun. 25, 2010, which claims priority to Spanish Patent Application No. P 200930367, filed Jun. 26, 2009, both of which are hereby incorporated by reference in their entireties.

This invention relates to a long-duration luminescent molecular thermometer and for temperature determination, preferably absolute temperatures. The thermometer comprises a molecular light emitting bi-lanthanide complex, inserted into a hybrid organic-inorganic matrix.

PREVIOUS STATE OF THE ART

A luminescent molecular thermometer is a new generation of analytical instruments. This type of thermometer consists of molecular species that provide temperatures through light signals that may be detected with high sensitivity. Therefore, the luminescent molecular thermometer has a great advantage in measuring temperature in very small spaces.

Several devices for temperature measurement in restricted areas or areas with a high spatial resolution (below a few micrometers) have been described, for example:
  Thermal microscopic scanning probes (resistance/thermocouple).
  Spectroscopic probing (Raman, infrared).
  Thermometers based on nanotubes (liquid expansion).
  Modification of conformation dependent on the temperature of molecular assemblies and molecular spring super structures.

The molecular probe is used to a mark location by radioactivity or fluorescence in different laboratory techniques. A thermocouple is a device composed of the union of two different metals that produces voltage, as a result of differences in temperature at the two ends. Thermocouples are used as temperature sensors. They are capable of measuring a wide temperature range.

Spectroscopic procedures are based on the study of the interaction between electromagnetic radiation and matter. Spectral analysis allows absorption detection or electromagnetic radiation emission to certain wavelengths and to relate these with the energy levels involved in a quantum transition. Infrared spectroscopy is a branch of spectroscopy related to the infrared part of the electromagnetic spectrum. This covers a set of techniques, the most common being a form of absorption electroscopy. Like other electroscopic techniques, it may be used to identify a compound and research a sample's composition. Infrared observation is limited by diffraction resolution (wavelength of a few micrometers). Raman spectroscopy is a spectroscopic technique used to study low-frequency modes, such as vibration and rotational among others. These Raman spectroscopic procedures and microscopic scanning systems have a reading output speed limited by the probe's movement and material and the surface conditions. Fluorescence spectroscopy is a type of electromagnetic spectroscopy that analyzes fluorescence emitted by a sample. Fluorescence spectroscopy uses a ray of light, normally ultraviolet, which excites the atom's or molecule's electrons from certain compounds and causes them to emit light.

The system based on nanotubes requires a scanning electronic microscope for observation. The scanning electronic microscope uses electrons instead of light to form an image. It has a great depth field, which allows it to focus on a large part of the sample at the same time. It also produces high-resolution images, which means that characteristics that are spatially close in the sample may be observed at high magnification.

Normally, luminescent phosphor thermographic screens require disintegration speed measurement or quantum performance.

There are luminescent molecular thermometers based on the emission of trivalent lanthanide in which the temperature is measured indirectly through the dependence with the temperature of the relative intensity between two 4f levels, such as described in the document titled $Gd_2O_3$ of nano-phosphor codoped with $Er^{3+}/Yb^{3+}$ for optical thermometry (Sunil Kumar Singh, Kaushal Kumar, S. B. Rai, Sensors and Actuators A, 149, 16-20, 2009). The quantum performance of the emission and the lifespan for level $^5D_0$ in Eu(III) tris(β-diketonate) complexes is described in the document titled: *Europium beta-diketonate temperature sensors: effects on ligands, matrix and concentration* (Gamal E. Khalil et al., Rev. Sci. Instrum 75, 192, 2004) and in the document titled *Luminescent Molecular Thermometers* (S. Uchiyama et al., J. Chem. Edu., 83 720, 2006). Furthermore, it is well known that β-diketonate complexes exhibit photodecomposition with UV radiation which reduces luminescent intensity (K. Binnemans, in Handbook on the Physics and Chemistry of Rare Earths, 35, Eds: K. A. Gschneidner Jr., J.-C. G. Bünzli, V. K. Pecharsky, Elsevier Science, Amsterdam 2005, 107).

A self-reference optical thermometer has been proposed which implies relative intensity between two different emissions based on a monomer-excimer reversible interconversion dependent on the temperature of 1,3-bis(1-pirenil) propane dissolved in an ionic liquid, as described in the document titled: *No-contact bicolor luminescent thermometry based on luminophosphorus intermolecular cyclization with an ionic liquid* (G. A. Baker et al., Chem. Commun., 2003, 2932-2933).

On the other hand, organic fluorescent dyes white-out rather quickly, generally in 30 minutes, thus they are not adequate for long term monitoring. (J. Lee & N. A. Kotov, Nanotoday, 2, 2007, 48-51). Fluorescence thermometers have also been described based on photoluminescence intensity reason in phosphorus materials doped with Tb, where relative intensity between two Tb(III) emissions in a Tb:$SiO_2$ specific glass and in the Tb:YAG glass for temperature monitoring in fiber optic thermometers are based on the dependence of the photoluminescence spectrum's temperature. (PL) (H. Aizawa et al. Sensors and Actuators A 126, 78-82, 2006).

In US patent application publication US 2003128737 A1, a fluorescent thermographic method is described as well as a particular system for its use in surface temperature measurement, which are replicable over time. This document describes a fluorescent probe sensitive to the temperature which comprises a rare earth element compound in a transparent to ultraviolet light and fluorescent environment in which the fluorescence intensity varies with the temperature. U.S. Pat. No. 4,791,585 describes a cryogenic thermometer which uses molecular luminescence to determine the temperature.

However, it would be desirable to find a high-sensitivity thermometer for long term use.

DESCRIPTION OF THE INVENTION

The luminescent molecular thermometer provided by this invention comprises a system that responds to heat and sends information about the temperature in absolute values in the form of light signals that may be detected with high sensitivity over long periods of time. That is, it works during time intervals of several days, much higher than duration times for organic dye based thermometers, in which the photo whitening phenomenon dramatically decreases the luminescence intensity in a few minutes.

The presence of tris(β-diketonate) complexes with the two different cations of lanthanide elements in the invention's thermometer allows the self-calibration of the latter and measurement of absolute temperature through relative intensities. These complexes are included in a hybrid organic-inorganic matrix which is designed to present an excited state T (normally a triplet state) with energy slightly above the emission state $^5D_4$ energy for one of the lanthanide cations, for example the Tb(III), which allows production of an energy transfer $^5D_4 \rightarrow T$ pushed thermally. Dependence on the temperature of intensity of emissions originated at the $^5D_4$ level is caused by the luminescence's competition with the transfer of energy from the cations Tb(III) at the matrix's excitation level of the hybrid organic-inorganic matrix and/or the tris(β-diketonate) complexes from the two lanthanide element cations. Since the energy difference between the excited state T and the emission state $^5D_0$ from the other lanthanide cations, for example the Eu(III), is sufficiently large to be thermally reached in that temperature range, Eu(III) emission intensity is independent of temperature, thus allowing self calibration of the luminescent molecular thermometer as well as absolute temperature measurement through relative intensity comparison between emissions of the Tb(III) and the Eu(III). Since the Eu(III) emission is essentially independent of temperature, the degree of photo stability (photo whitening) may be easily estimated, thus correcting the variation with the emission temperature of the Tb(III).

In the invention's examples, it is shown that it is possible to create nanoparticles (NP) covered with silica, a polymer or other similar materials or combinations thereof with a sufficiently low absorbance in the area of the region comprised between the near IR and the UV in which the thermometer operates, and to optically functionalize these structures by incorporating the lanthanide ions (such as $Eu^{3+}$ and $Tb^{3+}$), in such a way that their response depends on the absolute temperature. In an example of the invention, these results are obtained using typical procedures to produce magnetic NPs from maghemite or the like and their covering, such as the modified Ströber procedure, methods based on a polymeric matrix, or others. The same optical properties may be obtained placing two lanthanide species in a diureasil matrix.

During an initial approximation, the dependence on temperature of the excited state intensity may be described theoretically through the Mott-Seitz approach. However, the pertinent physical quantity that best describes these procedures is the population difference in the analyzed transitions which may be explained using the quantity $\Delta = I_{Eu}^2 - I_{Tb}^2$.

Figure 1:
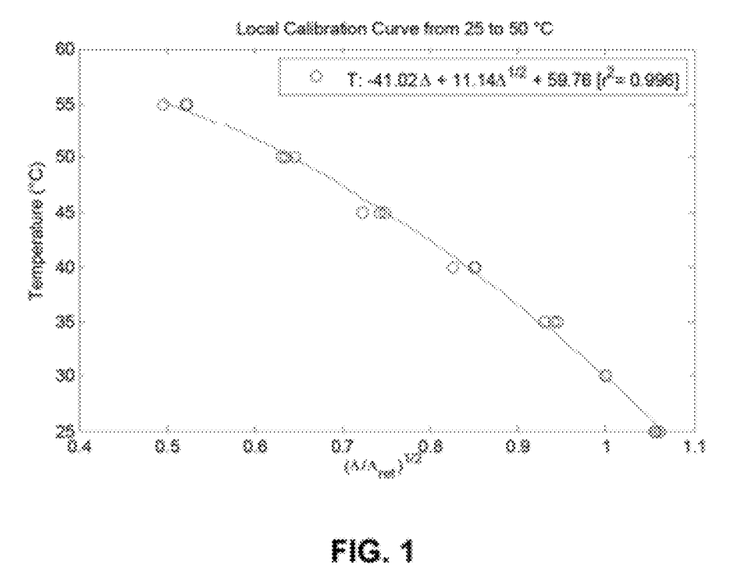
FIG. 1.—Shows the calibration curve obtained from the range of temperatures of 25 to 50° C. $\Delta=I_{Eu}^2-I_{Tb}^2$ The reference temperature used is 30° C., for the sample of diureasil with europium y terbium in the proportion of 0.25:0.75, respectively.

Even when photo degradation of the hosting materials is not negligible, it may be corrected using a reference temperature to calculate the parameter $\Delta$ and graphically draw $\sqrt{\Delta/\Delta_{ref}}$ as a function of the temperature on a local calibration curve (see also in FIG. 1)

Contrary to what was described on the state of the art, where temperature optical detection depends only on the population relative to the 4f levels, the luminescent molecular thermometer of the invention is based on the energy's equilibrium between the hosting levels and the excited states $Tb^{3+}/Eu^{3+}$. The thermometer's sensitivity and its work region critically depend on the non-radioactive transition velocity $Tb^{3+}$-host and the energy transfer from $Tb^{3+}$ to $Eu^{3+}$ and may be finely adjusted through a timely matrix and/or $Tb^{3+}:Eu^{3+}$ selection.

Therefore, and as was previously described, the presence of tris(β-diketonate) complexes of the two different cations of lanthanide elements allows the self calibration of the luminescent molecular thermometer, and the measurement of absolute temperature through relative intensities.

Furthermore, the hybrid organic-inorganic matrix comprising the tris(β-diketonate) complexes of the two cations of lanthanide elements adds three important advantages to the luminescent molecular thermometer of the present invention with respect to other similar products from the previous state of the art:
  i) it reduces photo degradation of the tris(β-diketonate) complexes, which changes as a function of the excitation wave's length;
  ii) allows a better material processability (as compared with isolated tris(β-diketonate) complexes); and
  iii) since the two cations of lanthanide elements are directly coordinated with the hybrid matrix, the excited states may participate in the energy transfer procedures previously mentioned deactivating the Tb(III) emission level and enabling adjustment of the range of operation temperature of the thermometer.

Therefore, an initial aspect of the present invention relates to the organic-inorganic matrix which comprises tris(β-diketonate) complexes of the two different cations of lanthanide elements (hereafter the matrix of the invention).

In the present invention, "organic-inorganic matrix" is understood as an inorganic polymeric network that contains organic groups in its structure, which is known as Class I hybrids, or also mixed complex structures in which both parts, organic and inorganic, are connected through covalent bonds. The lanthanide ions may be directly coordinated to functional groups specific of the hybrid network or they may weakly interact with the matrix, for example incorporating the complexes in the pores of the organic-inorganic host connected through hydrogen bonds or van der Waals interactions between hosted and complex. Examples of organic-inorganic matrix include hybrid amido-derivates or amino functional forming crosslinked sol-gel with alcoxisiloxane precursors, such as the 3-isocyanatopropiltrietoxisilane (ICPTES), the 3-glicidoloxipropiltrimetoxisilane (GPTMS) and the 3-aminopropiltrietoxisilane (APTES). Other amino-functionalized hybrid families are obtained through urea precursors [NHC(=O)NH] and urethane [NHC(=O)O]. The basic structure of these xerogels, respectively known as diureasil and diurethanesiles, consists of a siliceous skeleton in which the oligopoliether chains of different lengths are covalently anchored through urea or urethane bridges. Preferably, the matrix is composed of inorganic polymers based on siloxane derivative with organic groups. More preferably, the matrix is diureasil.

In another preferred embodiment, the matrix of the invention comprises cations of lanthanide elements in a trivalent oxidation state. In this invention, "lanthanide elements" are understood as a group of elements forming part of period 6 of the periodic table, and may be selected from a list that comprises, among others, Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Tulium (Tm), Ytterbium (Yb) and Lutetium (Lu). Preferably, the cations are of Europium (Eu) and Terbium (Tb).

In a preferred embodiment of the matrix of the invention, the molar relationship between the two lanthanide cations is within a range of 1:1 1:4. More preferably, the molar relationship is 1:3.

In another preferred embodiment, the matrix of the invention further comprises nanoparticles whose surface is capable of anchoring the bi-lanthanide compounds or the pair complex-organic-inorganic matrix. The complex together with the organic-inorganic matrix connects to functional groups which form the surface of the particle through bonds that may be covalent, hydrogen bridge or van der Waals, depending on the surface functionalization. In the example provided further below, these particles are magnetic, preferably covered with silica or a polymer.

In the present invention, "magnetic nanoparticles" are understood as nanometric size particles with magnetic properties, such as iron, nickel, cobalt and gadolinium particles. More preferably, the magnetic particles comprise iron oxide ($Fe^{2+}$ and/or $Fe^{3+}$) with a diameter comprised between 2 and 25 nm. The iron oxide may also contain another metal, such as, but not limited to Co, Ni, Mn, Gd, Be, Mg, Ca or Ba, or it may also consist of maghemite, magnetite or ferrite.

The magnetic particles must be covered in an enclosure subject to connect the matrix, i.e., by a material that is capable of covalently anchoring through a hydrogen bridge or van der Waals forces with the matrix of the invention. As non-limiting examples, the matrixes can be formed by silica or polymeric materials with functional groups capable of anchoring with the matrix of the invention.

These covered nanoparticles may be part of a heterogeneous solid, forming nanocomposites, or may be dispersed in a liquid, forming a stable colloidal suspension or a ferrofluid in the case of magnetic particles.

Anchoring the molecular thermometer to a nanoparticle provides a nanothermometer that may be used as an absolute temperature sensor in extremely reduced confinements. Among these and among others, nanoporous structures in catalyzers, nanofibers or biologic tissue cells can be mentioned.

A second aspect of this invention relates to a method for preparing the matrix of the invention, (hereafter method of the invention) which comprises the following steps:
a) preparing tris(β-diketonate) complex solutions of cations of lanthanide elements,
b) polymerizing a mixture of a matrix precursor with tris(β-diketonate) complex solutions of the cations of lanthanide elements from step (a).

In a preferred embodiment, the method of the invention further comprises the following step:
c) preparing a precursor mixture of the magnetic covered nanoparticles before step (b) and adding it to the mixture in step (b). Preferably the precursor mixture of nanoparticles comprises a ferrofluid.

In another preferred embodiment of the method of the invention, the precursor of the matrix is an alkyltriethoxysilane compound, where "alkyl" refers to aliphatic chains, lineal or branched, which comprising 1 to 18 carbon atoms, for example methyl, ethyl, n-prophyl, i-prophyl, n-butyl, terc-butyl, sec-butyl, n-penthyl, n-hexylene, etc. Preferably, the alkyl group has between 1 and 5 carbon atoms. More preferably, the alkyl group is ethyl, prophyl or butyl. The alkyl groups may be substituted by one or more substituents, such as a group selected from amino, amido, carboxylic ester, ether, thiol, acylamino or carboxamide. More preferably, the precursor is ureaalkyltriethoxysilane or uretanoalkyltriethoxysilane, and even more preferably, ureapropyltriethoxysilane or uretanotriethoxysilane.

Another aspect of this invention relates to the use of the matrix of the invention for the preparation of a luminescent molecular thermometer.

Therefore, one more aspect of this invention relates to a thermometer (hereafter the thermometer of the invention) which comprises the matrix of the invention. The thermometer of the invention will further comprise the necessary elements for temperature measurement, elements known by any person skilled in the art.

Therefore, in a preferred embodiment, the thermometer of the invention further comprises:
an excitation source that emits at a wavelength in a range extending from the infrared to close to ultraviolet, i.e., a wave length range from 200 to 1000 nm; and
detection equipment enabling direct or indirect intensity measurement in a wavelength range from the near infrared to the close ultraviolet, i.e., wavelength range that could extend from 200 to 850 nm, more preferably between 545 nm and 615 nm.

The excitation source that may be used in the invention can be selected among a xenon lamp, a mercury-xenon lamp and deuterium lamp or any other white light or wide-spectrum excitation source.

The lamp requires a high pass filter in order to block high wave lengths (second class lamp emissions) which affect later detection. Alternatively, LED (Light Emitting Diode) is also available, centered in 365 nm which are more economically viable since the emission band is centered on the excitation wavelength and there is no need for a filter.

The detection equipment may be selected from a photodiode, a photomultiplier or a CCD (Charge Couple Device) camera. Laboratory detectors for visible wave lengths may also be used.

The device features self compensation, since it works through the relative intensities of two emissions and electronic interaction with a matrix, providing absolute temperature measurements. Emission intensity measurement is easy, economical and consumes little time.

Another aspect of the invention relates to the use of the thermometer of the invention for measuring absolute temperatures.

In general terms, the thermometer of the invention enables measurement of absolute temperature with a high spatial resolution and no contacts. Preferred applications for the thermometers of the invention include the following:
Hot point localization in electric circuits.
Localized temperature measurements in medical applications (hyperthermia).
Power/conduction heat dissipation maps in medical applications.
Power/conduction heat dissipation maps in electromechanical microsystems.
Microfluidic: laboratory systems in a chip.
Temperature distribution maps in polymerization and jellification procedures.
Follow up of chemical reactions in a solution or a solid state.

Temperature distribution maps in systems featuring phase transitions.

Power/conduction heat dissipation maps in materials for magneto-caloric applications.

Temperature distribution maps in catalytic processes in nanoporous environs.

Nanothermometry.

Paints and inks of thermally variable colors.

Throughout the description and claims, the word "comprises" and its variants do not try to exclude other technical characteristics, additives, components or steps. For the skilled in the art, other objects, advantages or characteristics of the invention will emerge in part from the description and in part from the practical implementation of the invention. The following examples and drawings are provided for illustration purposes and they are not intended to be limiting of this invention.

BRIEF DESCRIPTION OF THE DRAWINGS

FIG. 8.—A.—Shows the theoretical thermal response of the prototype circuit; B.—Shows the electrical scheme used for temperature tests; C.—Shows the expected temperature distribution in the integrated circuit for a 2.0 A current; D.—Shows the temperature measurement with pyrometer, calculated theoretically and calculated use spectral test for the circuit.

EXAMPLES

Below is an illustration of the invention through trials carried out by the inventors, which demonstrate the specificity and effectiveness of the thermometer of the invention.

Procedure for Obtaining the Hybrid Organic-Inorganic Matrix

Materials

Iron chloride (II) ($FeCl_2$)
Iron chloride (III) ($FeCl_3$)
Sodium hydroxide (NaOH)
Hydrogen chloride (HCl)
Europium chloride (III) hexahidrated ($EuCl_3.6H_2O$)
Terbium chloride (III) hexahidrated ($TbCl_3.6H_2O$)
4,4,4-trifluorum-I-phenil-1,3-butanedione (btfa)
1,2-bis(4-piridil)ethane (bpeta)
Ethanol ($CH_3CH_2OH$)
Tetraethyl orthosilicate (TEOS)
Aminopropiltrietoxisilane (APTES)
α, ω-diaminpoli(oxiethilene-co-oxipropilene) (Jefamine ED-600®)
3-isocianatopropiltrietoxisilane (ICPTES)

Example 1

Diureasil Matrix with Lanthanide Complexes

Complexes of Eu(III) and Tb(III)

The synthesis of complexes Ln(III) was initiated by the addition of 0.1 mmol of bpeta to 0.1 mmol of Ln(bffa)$_3$.2H$_2$O (C. de Mello Donega et al., J. Chem. Soc. Chem. Commun. 1996, 10, 1199.) in a methanol solution. The reacting mixture was agitated for 24 hours at room temperature. The obtained complexes were filtered, washed and vacuum dried.

Organic/Inorganic Diureasil Hybrids

The first synthesis phase of the diureasil here studied involved the THF reaction of the isocyanate group ICPTES alkoxysilane precursor with groups (hydroxyl) of terminal amine of the doubly functional diamine Jefamine ED 600® (with a molecular weight of approximately 600 g*mol$^{-1}$, corresponding to approximately 8.5 repeat units ($OCH_2CH_2$)) to form an organic-inorganic hybrid precursor crosslinked with urea, known as ureapropyltriethoxysilane (d-UPTES (600)). The molar ratio of Jefamine ED-600® with respect to ICPTES was 1:2.

In the second stage, the complexes Eu(III) and Tb(III) were incorporated dissolving an appropriate quantity of these compounds in ethanol and an HCl volume was added (0.5 mol*L$^{-1}$) to this solution. The molar ratios are 1:3 and 1:4 for Eu(III):Tb(III) and ICPTES:$CH_3CH_2OH$, respectively. Finally, the mixed solution was added to the precursor.

Example 2

Iron Nanoparticles Covered in APTES/TEOS

Maghemite Nanoparticles

An iron chloride II and III solution was prepared (molar proportion 2:1) and the pH was made acidic through the addition of HCl. This solution was added dropwise to a concentrated NaOH solution to form a black precipitate, which was centrifuged and washed with distilled and deionized water.

The resulting solid was re-dispersed in a watery solution with a pH=2 and was aged for two days at room temperature. The diameter of the nanoparticles in this ferrofluid (FF) was estimated through dynamic light dispersion (DLD) in 19.2±4.0 nm. The ferro fluid's stability is very high.

Nanoparticle Covering with TEOS/APTES

Covering of the nanoparticles was carried out using the modified Ströber procedure. Using the prepared ferro fluid, an ethanol solution was prepared, adjusting its pH to 10. After agitating for 30 minutes, TEOS/APTES (1:1) was added and the resulting solution was aged at room temperature for four hours. The resulting brown solution was evaporated and the solid labelled as RNP.

Optical Functionalization of the Covered Nanoparticles

In separate flask, luminescent compound solution of terbium and europium (previously described as Ln(III) compounds) in the same mass concentration, using ethanol as solvent. The complex solutions and the RNP were combined in different proportions and the resulting solution was evaporated in an oven at 70° C. over 6 hours.

Example 3

Diureasil Matrix with Lanthanide Complexes Including Covered Iron Nanoparticles

Ethanolic solutions of Ln(III) compounds were prepared with equal mass concentration (6.0 mg/ml). 0.5 ml of hybrid organic-inorganic precursor were added in a flask (d-UPTES (600) or simply dU600) to 0.2 ml of ethanolic solution Eu(III), 0.6 ml of ethanolic solution Tb(III), 0.2 ml of FF and 0.1 ml of distilled water. The solution was agitated during 30 minutes and dried in the oven. A solid orange opaque monolith was obtained.

Example 4

Temperature Detection

Temperature detection using the diureasil matrix from example 1 (without nanoparticles) was carried out using a basic computation over the photoluminescence spectrums. The spectrums' baseline was eliminated and the maximum peak in the 530-560 nm and 600-640 nm intervals was evaluated to extract recounts of maximum transition for terbium ($I_{Tb}$) and europium ($I_{Eu}$), respectively. The Δ parameter defined as:

$$\Delta = I_{Eu}^2 - I_{Tb}^2$$

gives a measurement of the population difference in the excited levels of $Eu^{3+}$ and $Tb^{3+}$ and it is the most precise quantity to carry out temperature detection.

Local Calibration Curve

The reference temperature was used and $\sqrt{\Delta/\Delta_{ref}}$ was depicted as a function of the temperature. The cyclical tests enabled the production of the results presented in FIG. 1.

Tests in Temperature Interval of 10-290 K

Dependence of the intensity of the two transitions on temperature is closely related with non-radioactive transitions that reduce the detected intensity. The lifespan of the excited state is described through the Mott Seitz configurational model in terms of radioactive lifespan through:

$$\frac{1}{\tau} = \frac{1}{\tau_{rad}} + \frac{C}{\tau_{rad}} \exp\left(\frac{-\Delta E}{k_B T}\right)$$

where:
- τ: Lifespan of the excited state
- $\tau_{rad}$: Lifespan of the radioactive excited state.
- C: Thermal inactivation factor
- ΔE: Activation energy
- $k_B$: Boltzmann constant
- T: Absolute temperature This expression may be rewritten in terms of excited state lifespan as:

$$\tau = \frac{\tau_{rad}}{1 + C\exp\left(\frac{-\Delta E}{k_B T}\right)}$$

Which, using the relationship between intensity and lifespan:

$$I = \int_0^\infty I(T)\exp\left(\frac{-T}{\tau(T)}\right) dT = I_i \tau$$

The dependence of the intensity on temperature is written using the intensity of reference and allows writing the theoretical dependence of the intensity on temperature:

$$I(T) = \frac{I_0}{1 + C\exp\left(\frac{-\Delta E}{k_B T}\right)}$$

Figure 2:
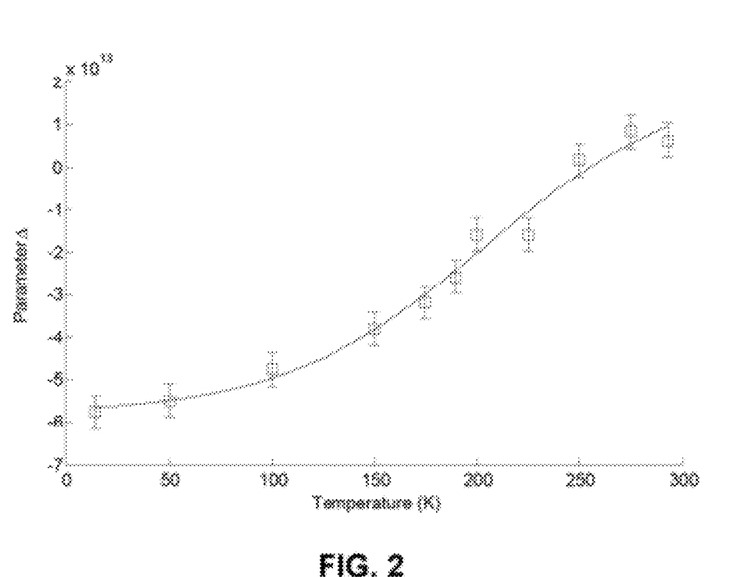
FIG. 2.—Shows the dependence of $\Delta$ for the temperature range from 10 to 300 K, for the sample of diureasil with europium y terbium in the proportion of 0.25:0.75, respectively.

It is possible to obtain a reasonable adjustment of experimental data with this model and to calculate the activation energy for the transition being monitored. In FIG. 2 and in FIG. 3 the adjustments according to this expression are presented.

Figure 3:
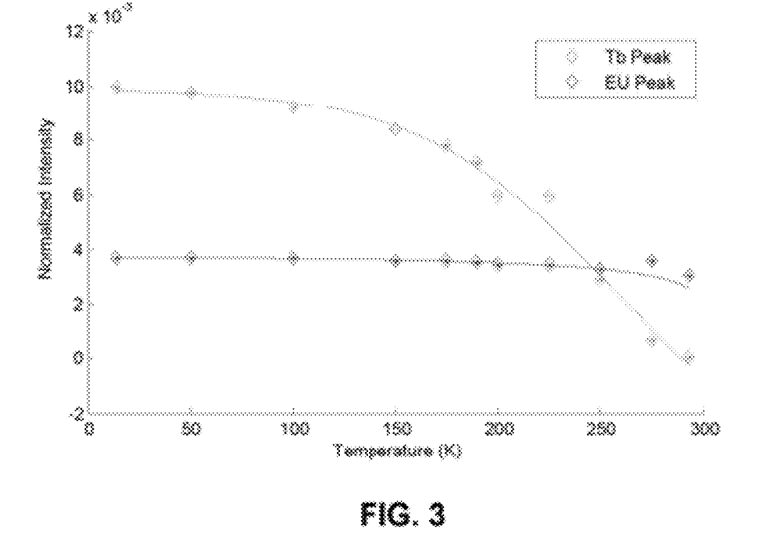
FIG. 3.—Shows the dependence of $\Delta$ for the temperature range from 10 to 300 K, i.e., relative intensity of the peak transitions of $Tb^{3+}$ and $Eu^{3+}$.

This is a particularly interesting result due to the sensitivity distributed in an interval of 10 K to 360 K (in this graphic only the interval 10-300 K is presented), which makes it very attractive for applications in this interval. Negative values of Δ mean that the transition allocated to $Tb^{3+}$ is more populous than Ue $3+$.

Figure 4:
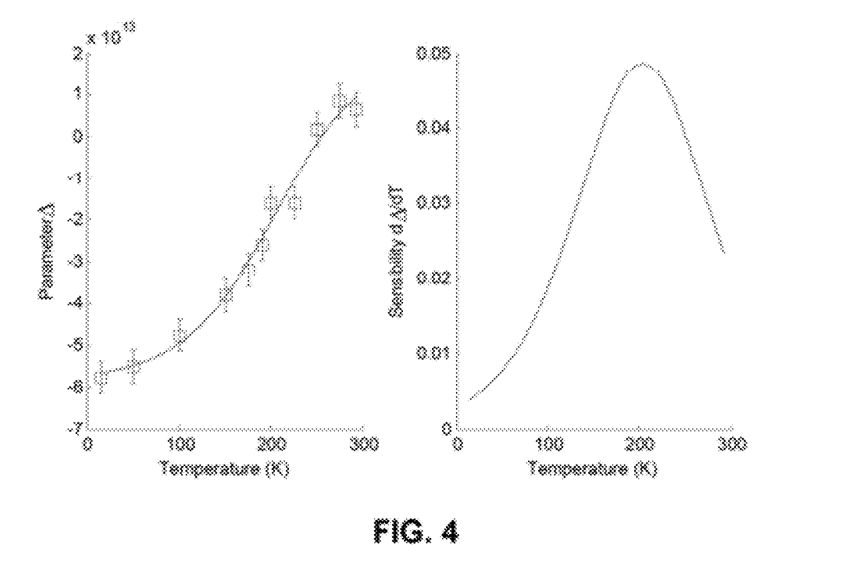
FIG. 4.—Shows the dependence of the $\Delta$ parameter with the temperature and its sensibility for the temperature range from 10 to 300 K, for the sample of diureasil with europium y terbium in the proportion of 0.25 for 0.75.

The sensitivity of this material can be assessed by performing the first derivative of the amount Δ depending on the temperature. This calculation leads to a maximum sensitivity close to 210 K and to a wide Gaussian curve that is presented in FIG. 4.

Example 5

Detection of the Temperature

The detection of temperature was carried out using the matrix of diureasil in example 3 (with nanoparticles). The same algorithm that was used for the diureasil complexes was applied to the magnetic nanoparticles coated with silica (TEOS/APTES) and joined to the luminescent complexes. Here it is possible to adjust the proportion $Eu^{3+}$:$Tb^{3+}$ adsorbed in the layer of silica and to carry out some adjustment with the temperature of maximum sensitivity. In a certain proportion of $Ue^{3+}$:$Tb^{3+}$ there is a behaviour that shows a reasonable adjustment with the same expression used for the diureasil complexes in matrix.

Here, the dependence and the temperature of maximum sensitivity are quite different with regard to the luminescent particles in the diureasil matrix. This means that, changing the matrix in which the lanthanide are present and the proportion of rare earth ions, it is possible to adjust the interval of operation and the temperature of maximum sensitivity by using the same fundamental physical procedures to describe it.

Figure 5:
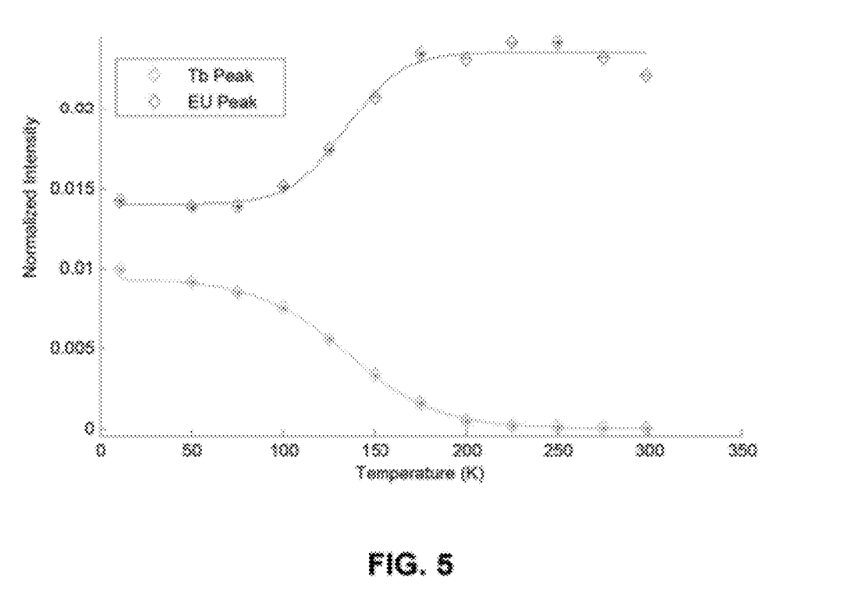
FIG. 5.—Shows the dependence of the peak intensity for the peaks of europium and terbium with the temperature, for the sample of TEOS/APTES with europium and terbium in the proportion 0.33 for 0.66.
Figure 6:
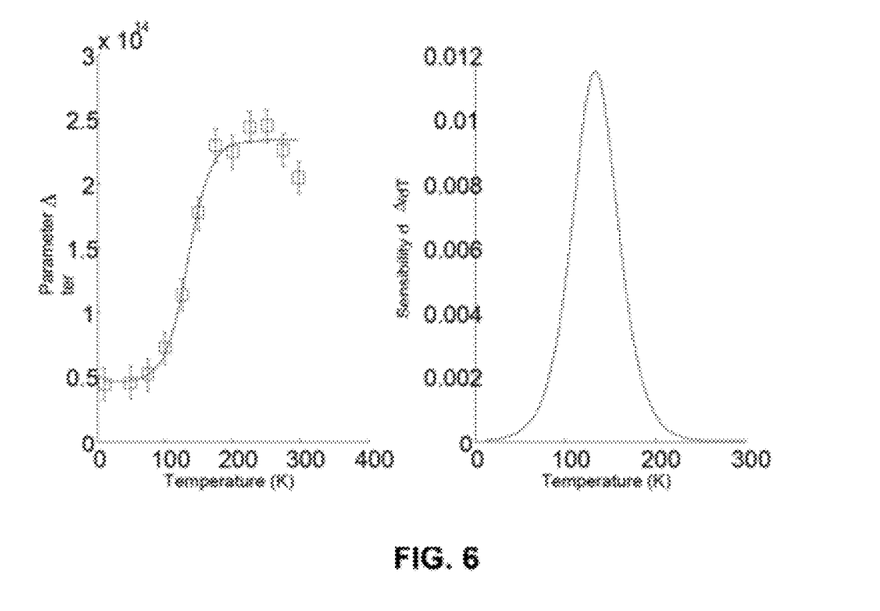
FIG. 6.—Shows the dependence of the A parameter with the temperature and its sensitivity in the temperature range of 10 to 300 K, for the sample of TEOS/APTES with europium and terbium in the proportion 0.33 for 0.66.

The concept of using spectroscopic measures to infer the absolute temperature is applicable here, which makes it clear that it is not a restricted procedure either to a single host matrix or to only one pair of lanthanide ions (see FIG. 5 and FIG. 6).

Example 6

Temperature Detection Demonstration

The equipment used in the demonstration was a spectrofluorimeter with a TRIAX 320 emission monochromator, which allows adjusting the excitation wavelength and measure the emission intensity (in counts per second) to a wavelength range defined by the user.

The excitation was carried out at a wavelength $\lambda_{exc}=365$ nm and the intensity was measured for the range of wavelengths $\lambda=400$-720 nm. The demonstration was carried out for the interval of temperature 25-55° C. (300-330 K) for purposes of calibration. A cycle of temperature was carried out and the measures of photoluminescence were performed in the increase in temperature. The experimental parameter used is $\Delta=I_{Eu}^2-I_{Tb}^2$.

Using a temperature of reference and representing $\sqrt{\Delta/\Delta_{ref}}$ in function of the temperature, the experimental curve represented in FIG. 1 was obtained for the material prepared by means of Example 1. The curve of adjustment is a local calibration curve that can be used for the detection of temperature in the interval presented.

Example 7

Variable Temperature Detection Demonstration

In order to demonstrate the versatility of the temperature molecular sensor, an integrated circuit was manufactured with variable resistance as a thermal source capable of presenting a spatial distribution of temperatures. The circuit was defined using the dependence of the power dissipated by the Joule effect. The variables used in this section are presented in the diagram in FIG. 7.

The power dissipated by the Joule effect is, in terms of the electric resistance, the difference of potential and the electric current is:

$$P=VI=RI^2$$

The energy and the increase in temperature is given by:

$$Q=mc\Delta T$$

The use of the electrical and geometrical parameters allows computerizing the electrical resistance:

$$R=\rho\frac{L}{xy}$$

Using previous expressions it can be written:

$$\rho_{el}\frac{L}{xy}I^2 = mc\Delta\theta \cdot \Delta t \Leftrightarrow \rho_{el}\frac{L}{xy}I^2$$
$$= \rho_m xyL \cdot c\Delta\theta \cdot \Delta t \Leftrightarrow \Delta\theta$$
$$= \frac{\rho_{el}I^2}{\rho_m c(xy)^2 \Delta t}(K)$$

Therefore, the theoretical prediction is obtained using the dimensions of the electric guide cross section and the electric and thermal parameters of the material that constitutes it (copper). The expression is:

$$T = T_{amb} + \frac{\rho_{el}I^2}{\rho_m c(xy)^2}$$

Where x and y are the dimensions of the electric guide cross section, c is the thermal capacity, $\rho_m$ is the density and $\rho_{el}$ is the electric resistivity of the material. $T_{amb}$ is the room temperature.

Figure 8:
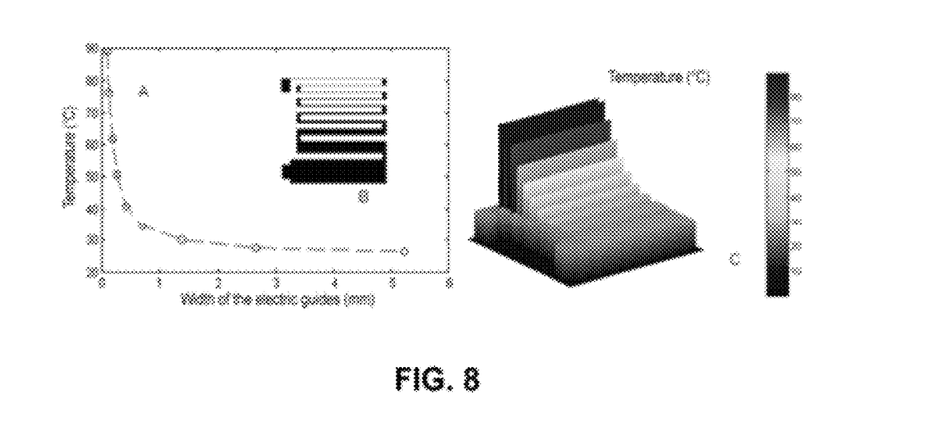

Using the physical parameters for brass, and an additional resistance in the entrance of the electric system, the increase in temperature expected is represented in the graphic of FIG. 8.

The widths were adjusted to reach temperatures (assuming that all the energy is dissipated by the system) with values that allow a good coverage in a range of 30° C.

This result is shown in the circuit presented in FIG. 8. The circuit test is composed by the association of this circuit with an input resistance that represents the resistance of the contacts.

The source used allows the adjustment of the voltage and the current in this circuit, making tests possible in several temperature ranges, adjusting a given pair of tension/current. This was numerically simulated and the range of temperatures was evaluated for 2 V in the input (FIG. 8B).

The detection of temperatures has been done in the area of the narrowest tracks for practical reasons, due to space limitations in the radiation detection equipment. The theoretical curve that allows predicting the variation of temperature, varying the current that feeds the circuit is presented in FIG. 8A, which shows the temperature theoretically expected for a current of 2 A in the circuit; FIG. 8B shows the diagram of the circuit used; FIG. 8C shows the spatial distribution of temperatures and the measurements obtained by the pyrometer, by the theoretical prediction and by the spectral measurement, according to the calibration curve presented in FIG. 1.

Figure 7:
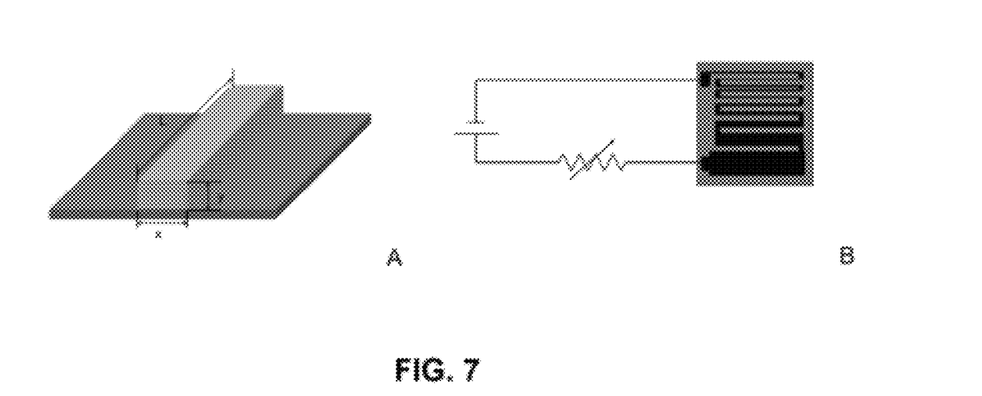
FIG. 7.—Shows the scheme of tracks used as a temperature measurement prototype and the final circuit implemented using copper over a standard plastic plate.
Figure 8D:
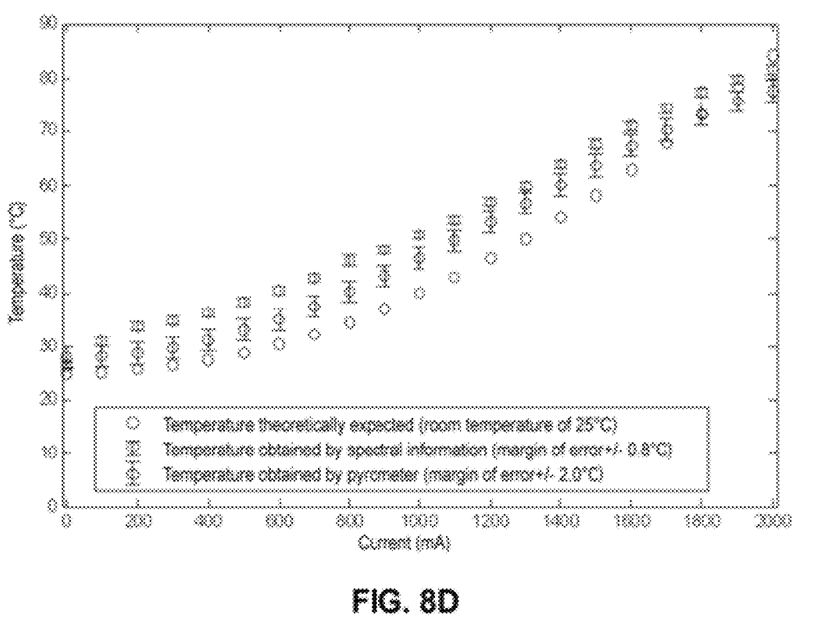

The graphics in FIG. 7 show the dependence of the temperature theoretically predicted for the circuit fed by a current of 2.0 A, using the physical parameters that characterize it. In FIG. 8D the concordance between the values expected and measured by the two methods is evidenced, showing that both measurements are equivalent.

In addition, the calibration measurement was done using the circuit presented in FIG. 8. Painting the integrated circuit with the solution of $dU_{600}$-$Tb_{0.75}$ $Ue_{0.25}$ and evaporating it in an oven for a night it was possible to obtain a transparent layer coating the copper tracks.

The painted circuit was heated by means of an electric current and the temperature and the measured emission by using a "normal" spectrometer.

To obtain the measurement of temperatures a commercial pyrometer was used and the data of temperatures was used for calibration purposes.

The commercial pyrometer used is TFA ScanTemp410, with parameters presented in the following table.

| Property | Manufacturer Specification |
|---|---|
| Temperature Range | −33° C. to +500° C. |
| Precision | ±2° C. or 2% |
| Operating Environment | 0° C. to +50° C. |
| Response Time | 1 second |
| Numerical opening | 5 degrees (11:1) |

Figure 9:
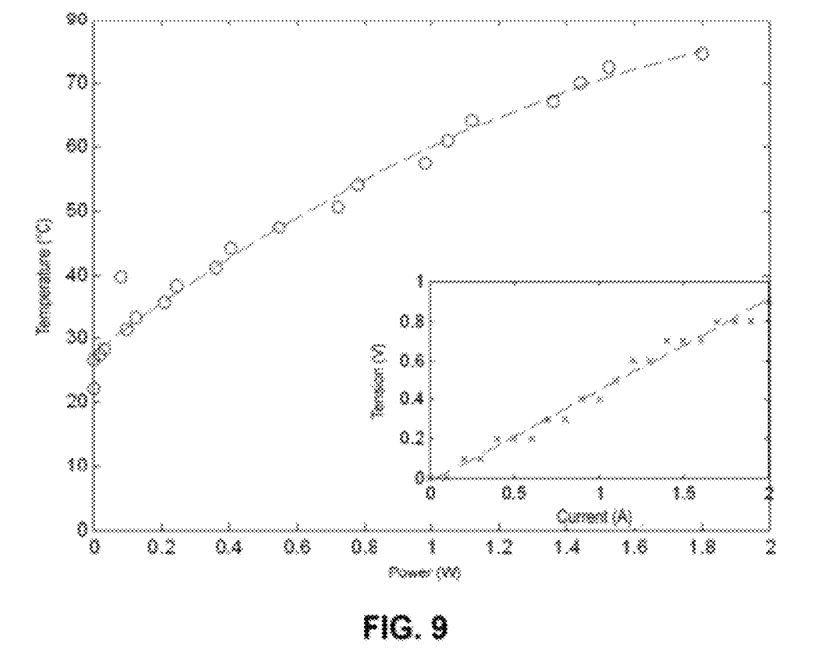
FIG. 9.—Shows the temperature measured by the pyrometer for the different dissipated power values. This curve was used to calculate the temperature using the power dissipated by the circuit, estimated by $P=RI^2$, as calibration parameter.

The calibration procedure uses the commercial pyrometer to measure the temperature depending on the power transferred to the circuit. The graphic is presented in FIG. 9. The insertion represents the VI behaviour of the circuit. The electric resistance was evaluated by the slope of the VI graphic and the power was calculated using the power dissipated by the Joule effect. This produces a curve that allows calculating the temperature using the power transferred to the circuit.

Figure 10:
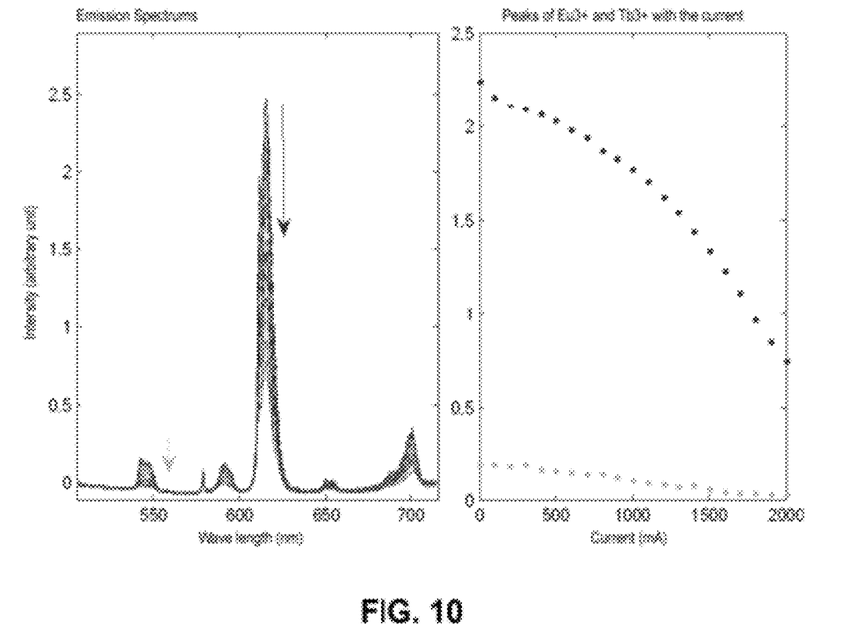
FIG. 10.—Shows the emission spectrums obtained for different currents fed to the circuit and the EU emission (around 615 nm) and Tb (around 545 nm).

In the following step, the circuit inside the spectrometer was used and the spectrum was measured for the given pairs of tension/current. The relevant optical parameters were calculated using the delta: $\Delta = \sqrt{I_{Eu}^2 - I_{Tb}^2}$. Where the intensities are calculated by the integrated area, and the delta parameters were normalized to the lowest temperature (room temperature=23° C.) (see FIG. 10).

The temperature was extrapolated by the calibration curve obtained in the calibration procedure (carried out before this experiment: $T_{spectral} = -45.81 \Delta^2 + 11.60 \Delta + 59.82$), and the estimated uncertainty (0.8 C) was used in the error bars.

Figure 11:
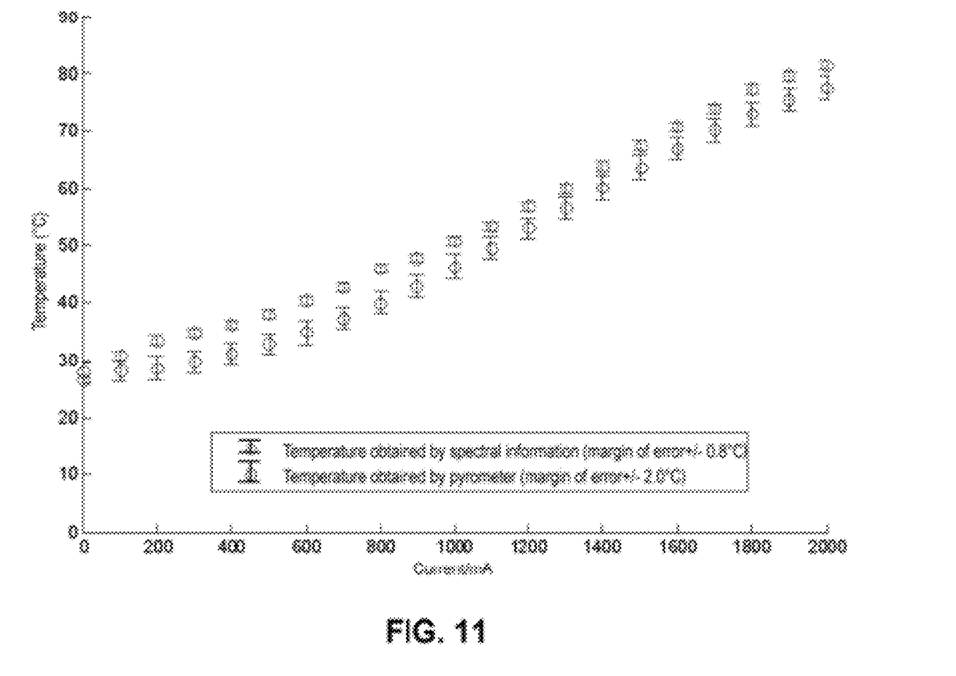
FIG. 11.—Shows the comparison between the temperature measured by the pyrometer and the temperature obtained from the spectral analysis showing a good correlation, which proves that the temperature measurements with the two methods is comparable.

The extrapolated spectral temperature and the pyrometer temperature show the same behaviour, showing that the material can be used as a temperature sensor. The temperature obtained by the two methods was outlined and the graphic shown in FIG. 11 was produced.

The measurement of temperatures that the previously obtained calibration curve uses was compared with the measurement given by a commercial pyrometer with a good adjustment between the two methods. The calibration curve showed that it produces valid results even for samples that have been prepared 5 months prior to temperature tests.

The invention claimed is:

1. An organic-inorganic matrix comprising a tris(β-diketonate) complex,
    wherein the complex comprises two different cations of lanthanide elements;
    wherein the two cations are in a trivalent state of oxidation;
    wherein the two cations are europium (Eu) and terbium (Tb);
    wherein the terbium cation presents an excited state $^5D_4$;
    wherein the matrix presents an excited state T; and
    wherein the energy of the excited state T is such that allows a thermally pushed energy transfer $^5D_4 \rightarrow T$.

2. The matrix according to claim 1, wherein the molar ratio of europium to terbium is 1:3.

3. The matrix according to claim 1 comprising siloxane-based inorganic polymers derivatized with organic groups.

4. The matrix according to claim 3, wherein the matrix is diureasil, diurethanesil or any other amino-functionalized hybrid.

5. The matrix according to claim 1, further comprising coated nanoparticles.

6. The matrix according to claim 5, wherein the nanoparticles are magnetic and are coated with silica, a polymer or its combinations with functional endings that allow linking said matrix.

7. The matrix according to claim 6, wherein the magnetic nanoparticles are iron oxide.

8. A method for obtaining the matrix according to claim 1, comprising:
    a) preparing solutions of a tris(β-diketonate) complex, wherein the complex comprises cations of lanthanide elements, and
    b) polymerizing of a mixture of a matrix precursor with the solutions of tris(β-diketonate) complex of step (a).

9. The method according to claim 8, further comprising:
    c) prior to step (b), preparing a precursor mixture of coated magnetic nanoparticles and adding the precursor mixture to the mixture of step (b).

10. The method according to claim 9, wherein the precursor mixture of magnetic coated nanoparticles of step (c) comprises a ferrofluid.

11. The method according to claim 8, wherein the matrix precursor is an ureaalkyltriethoxysilane compound.

12. The method according to claim 11, wherein alkyl of the ureaalkyltriethoxysilane is a propyl and the matrix precursor is an ureapropyltriethoxysilane compound.

13. A method for the measurement of the absolute temperature comprising using a thermometer comprising the organic-inorganic matrix according to claim 1, the method comprising the following steps:
    a) coating a surface with the organic-inorganic matrix;
    b) exposing the coated surface obtained in step (a) to an excitation source that emits a wavelength in a range from the near infrared to the ultraviolet, wherein the excitation source is selected from the group consisting of a xenon lamp, a mercury-xenon lamp and a deuterium lamp and any another white light or broad spectrum excitation source;
    c) detecting at least two fluorescence emission induced in step (b) with a detection equipment selected from the group consisting a photodiode, a photomultiplier and a CCD camera (Charge Couple Device); and
    d) determining the absolute temperature by calibrating the ratio of fluorescence of two emissions.

14. The method according to claim 13, wherein the absolute temperature is measured with spatial resolution using optical microscopy techniques.

15. The method according to claim 13, wherein the temperature is induced by the application of an external alternate magnetic field with temporary and spatial resolution.

16. A thermometer comprising the organic-inorganic matrix according to claim 1.

17. The thermometer according to claim 16, further comprising:
    an excitation source that emits a wavelength in a range from the near infrared to the ultraviolet and
    detection equipment that allows the direct or indirect measurement of intensities in a wavelength range from red to green.

18. The thermometer according to claim 17, wherein the excitation source is selected from the group consisting of a xenon lamp, a mercury-xenon lamp and a deuterium lamp and any another white light or broad spectrum excitation source.

19. The thermometer according claim 17, wherein the detection equipment is selected from the group consisting a photodiode, a photomultiplier and a CCD camera (Charge Couple Device).

20. The thermometer according to claim 17, wherein the detection equipment allows the direct or indirect measurement of intensities in a wavelength range from the 200 nm to the 850 nm.

21. The thermometer according to claim 20, wherein the detection equipment allows the direct or indirect measurement of intensities in a wavelength range from 545 nm to 615 nm.

* * * * *